US008954608B1

(12) United States Patent
Tomic et al.

(10) Patent No.: US 8,954,608 B1
(45) Date of Patent: Feb. 10, 2015

(54) NETWORK CLOCK SYNCHRONIZATION USING TOTAL-FIELD MAGNETOMETERS AND THE SPATIAL COHERENCE OF THE EARTH'S GEOMAGNETIC FIELD

(75) Inventors: Mihajlo Tomic, San Diego, CA (US); Michael R. Hughes, San Diego, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 630 days.

(21) Appl. No.: 13/355,141

(22) Filed: Jan. 20, 2012

(51) Int. Cl.
*G06F 15/16* (2006.01)

(52) U.S. Cl.
USPC .......................................... 709/248; 370/503

(58) Field of Classification Search
USPC ........... 709/248, 208; 370/503, 350; 375/356; 324/301
See application file for complete search history.

(56) References Cited

U.S. PATENT DOCUMENTS

| | | | | |
|---|---|---|---|---|
| 7,499,423 | B1 * | 3/2009 | Amos et al. | 370/324 |
| 7,920,881 | B2 * | 4/2011 | Fullam | 455/502 |
| 7,949,356 | B2 * | 5/2011 | Yonge et al. | 455/502 |
| 8,249,049 | B2 * | 8/2012 | Silverman et al. | 370/350 |
| 8,737,378 | B2 * | 5/2014 | Mainaud et al. | 370/350 |
| 8,749,398 | B2 * | 6/2014 | Montgomery et al. | 340/853.7 |
| 2014/0177656 | A1 * | 6/2014 | Mian et al. | 370/512 |

OTHER PUBLICATIONS

A. Rowe, V. Gupta, and R. Rajkumar; Low-power Clock Synchronization using Electromagnetic Energy Radiating from AC Power Lines; 7th ACM Conference on Embedded Networked Sensor Systmes (SensSys), Nov. 2009.

S. Palchaudhuri, A. Saha, and D. Johnson; Adaptive Clock Synchronization in Sensor Networks; Proceedings of IEEE/ACM IPSN 2004 Conference, Apr. 2004.

B. Sundararaman, U. Buy, and A. Kshemkalyani; Clock Synchronization for Wireless Networks: A Survey; Ad Hoc Networks, vol. 3, No. 3, May 2005, pp. 281-323.

M. Hughes, M. Tomic; Geomagnetic Noise Analysis and Suppression from Next Generation Autonomous Systems 2009 Sea Trials; Oceans 2010 Conference, pp. 1-6, ISBN 978-1-4244-4332-1, Sep. 20, 2010.

M. Tomic, P. T. Sullivan, V. K. McDonald; Wireless, Acoustically Linked, Undersea, Magnetometer Sensor Network; Oceans 2009, MTS/IEEE Biloxi—Marine Technology for Our Future: Global and Local Challenges; Oct. 26-29, 2009.

* cited by examiner

*Primary Examiner* — Louis Arana
(74) *Attorney, Agent, or Firm* — SPAWAR Systems Center Pacific; Kyle Eppele; J. Eric Anderson

(57) ABSTRACT

A method for synchronizing network clocks comprising the following steps: measuring with a first magnetometer the geomagnetic field at a first network node; processing data measured by the first magnetometer to generate first sensor spatially-coherent data; measuring with a second total field magnetometer the Earth's magnetic field at a second network node, wherein the second magnetometer is physically separated from the first magnetometer by a distance of up to one kilometer; processing data measured by the second magnetometer to generate second sensor spatially-coherent data; transmitting the first sensor spatially-coherent data from the first network node to the second network node; calculating a clock drift between the first and second network nodes based on the first sensor spatially-coherent data and the second sensor spatially-coherent data; and adjusting the second node system clock to match the first node system clock based on the calculated clock drift.

17 Claims, 4 Drawing Sheets

NETWORK CLOCK SYNCHRONIZATION USING TOTAL-FIELD MAGNETOMETERS AND THE SPATIAL COHERENCE OF THE EARTH'S GEOMAGNETIC FIELD

FEDERALLY-SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; sscpac_t2@navy.mil. Reference Navy Case Number 100913.

BACKGROUND OF THE INVENTION

In distributed networks, each individual processor within the network has its own internal clock, by which it coordinates all of its operations. Unfortunately, due to imperfections in the quartz crystals used to generate computer clock signals, the system clock can operate at slightly different frequencies throughout the day. This causes nodes within the network to differ by seconds daily, and these errors can accumulate over time to a large number of minutes. Any lack of synchronization between nodes in a network, can cause severe problems when data fusion is desired.

Many of the clock synchronization methods presented in the prior art involve synchronizing each clock within the network with an external time standard, such as GPS. This method works well for physical clock alignment, meaning that the clocks are aligned to the exact correct time. However, this method is difficult, since it requires an accurate clock source which is often not available to sensor networks, especially to those that are underwater and do not have access to a GPS signal. For example, an undersea network of magnetometers intended for undersea sensing systems, does not have a GPS signal available, or any other accurate clock source for that matter.

Another method heavily discussed in the prior art involves the transmission of time-stamped messages between sensor pairs. This is performed either in a master-slave configuration or peer-to-peer. There are many variations upon this basic premise, which vary solely on the specific implementation details, including such items as whether internal or external synchronization is used, and whether a probabilistic or deterministic algorithm is used. The disadvantages of this approach are many, particularly for a wireless network. First, variable transmission latency between nodes can cause incorrect clock skew calculations, because this calculation relies upon exact knowledge of the transmission latency, and the time at which the time-stamped message was transmitted. Second, this approach requires exact knowledge of the locations of network nodes, in order to determine the transmission latency. Therefore, these methods are very difficult to implement in an ad-hoc network.

SUMMARY

Disclosed herein is a method for synchronizing network clocks. The first step provides for measuring with a first total field magnetometer the Earth's magnetic field at a first network node over a time period X as gauged by a first node system clock, wherein the first magnetometer has a resolution of 15 nano-Teslas or less. The next step provides for processing data measured by the first magnetometer to generate first sensor spatially-coherent data. The next step provides for measuring with a second total field magnetometer the Earth's magnetic field at a second network node over the time period X as gauged by a second node system clock, wherein the second magnetometer has a resolution of 15 nano-Teslas or less, and wherein the second magnetometer is physically separated from the first magnetometer by a distance of up to one kilometer. The next step provides for processing data measured by the second magnetometer to generate second sensor spatially-coherent data. The next step provides for transmitting the first sensor spatially-coherent data from the first network node to the second network node. The next step provides for calculating a clock drift between the first and second network nodes based on the first sensor spatially-coherent data and the second sensor spatially-coherent data. The next step provides for adjusting the second node system clock to match the first node system clock based on the calculated clock drift.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

Disclosed herein is a method for logically synchronizing the clocks for any terrestrial wired or wireless network. The Earth's geomagnetic field between 1 and 30 millihertz (mHz) is spatially coherent at distances up to a few kilometers. This implies that the Earth's geomagnetic field is the same in magnitude and time-variation at multiple locations at the same time. The claimed method utilizes low-power total-field magnetic sensors, located at each node within a network to record the Earth's geomagnetic field. The recorded geomagnetic field between pairs of nodes is then compared to determine the clock skew between the pair of nodes. The clock skew is then used to adjust a nodes own system clock to match that of another node. This geomagnetic field comparison may be computed one or more times per day as necessary. This method reliably time-aligns nodes within a network.

Figure 1:
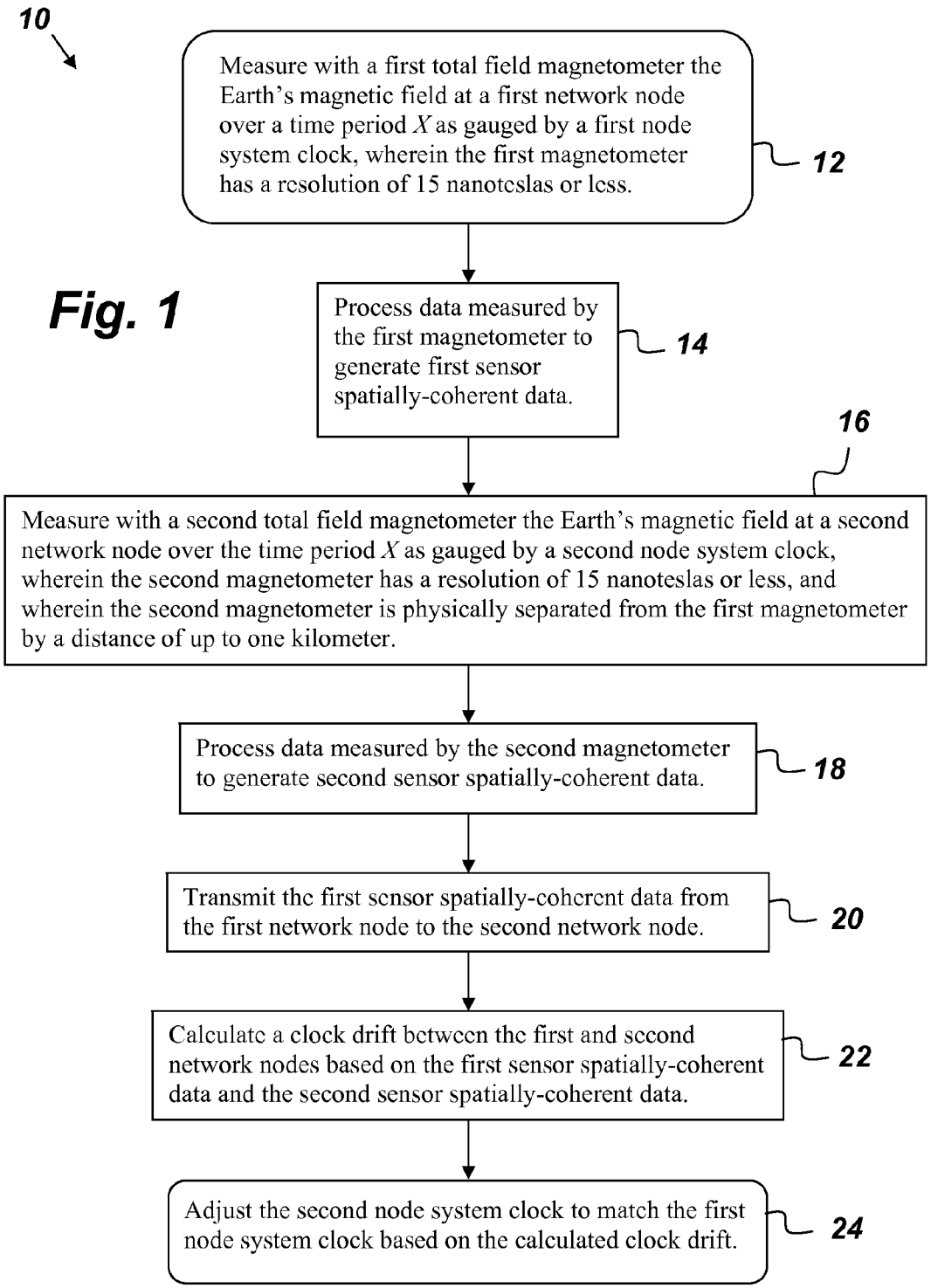
FIG. 1 is a flowchart of a network clock synchronization method.

FIG. 1 is a flowchart representation of the method for synchronizing network clocks, referred to hereafter as method 10. Method 10 utilizes the Earth's geomagnetic field as an external reference for synchronizing nodes within a network. Unlike other external reference methods for clock-synchronization (such as GPS), the Earth's geomagnetic field is available at any terrestrial location. Method 10 comprises the following steps. First, step 12 provides for measuring with a first total field magnetometer the Earth's magnetic field at a first network node over a time period X as gauged by a first node system clock. The first magnetometer has a resolution of 15 nanoteslas (nT) or less. Step 14 provides for processing data measured by the first magnetometer to generate first sensor spatially-coherent data. Then, step 16 provides for measuring with a second total field magnetometer the Earth's magnetic field at a second network node over the time period X as gauged by a second node system clock. The second magnetometer also has a resolution of 15 nT or less. The second magnetometer may be physically separated from the first magnetometer by a distance of up to one kilometer. Step 18 provides for processing data measured by the second magnetometer to generate data referred to as second sensor spatially-coherent data. Step 20 provides for transmitting the first sensor spatially-coherent data from the first network node to the second network node. Step 22 provides for calculating a clock drift between the first and second network nodes based on the first sensor spatially-coherent data and the second sensor spatially-coherent data. Then, step 24 provides for adjusting the second node system clock to match the first node system clock based on the calculated clock drift.

Figure 2:
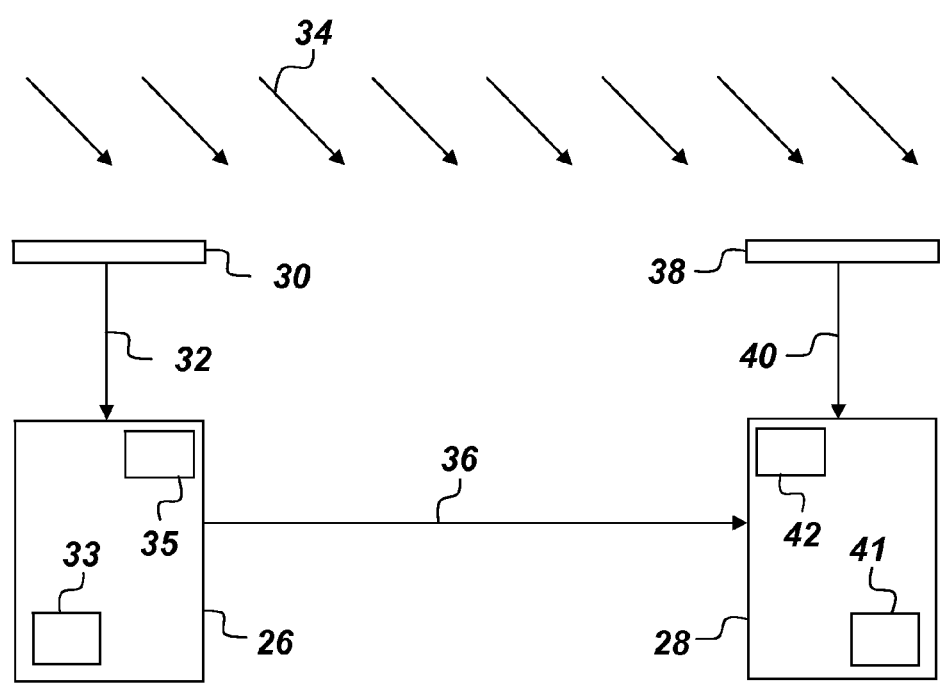
FIG. 2 is a depiction of networks nodes configured to implement the network clock synchronization method.

FIG. 2 is a high-level illustration depicting a first network node 26 and a second network node 28 configured to implement the method 10. The first node 26 is operatively coupled to a first total field magnetometer 30, which is configured to generate a first output signal 32, which comprises geomagnetic noise data over a time period X as gauged by a first node system clock 33 at a sampling rate Y. In other words, the first output signal 32 is representative of the Earth's magnetic field 34 at the location of the first magnetometer 30 during the time period X. The first node 26 receives and records the first output signal 32 in a first memory store 35. Once the first output signal 32 is recorded, the first node 26 processes and may optionally decimate the recorded geomagnetic noise data by a factor Z to create a first sensor spatially-coherent data 36. The first node 26 then transmits the first sensor data 36 to the second node 28.

The second node 28 is operatively coupled to a second total field magnetometer 38, which is configured to generate a second output signal 40, which comprises geomagnetic noise data over the time period X as gauged by a second node system clock 41 at the sampling rate Y. In other words, the second output signal 40 is representative of the Earth's magnetic field 34 at the location of the second magnetometer 38. The second node 28 receives and records the second output signal 40 in a second memory store 42 where the recorded output signal 40 may be further processed by the second node 28 to create the second sensor spatially-coherent data referred to in step 18 of FIG. 1. The second node 28 is configured to compute a cross-correlation between the first sensor data 36 and the second sensor data. If the first sensor data 36 is decimated, the second node 28 is configured to upsample the decimated signal 36 by a rate equal to the decimation factor Z prior to the cross-correlation computation. The second node 28 is also configured to compute a lag at which the cross-correlation is maximized, and further configured to convert this lag into a unit of time (the clock drift) based on the sampling rate Y. The resulting clock drift can then be used by the second node 28 to adjust the second node system clock 41 to be logically aligned with the first node system clock 33.

The first and second magnetometers 30 and 38 may each be any total-field magnetometer. A suitable example of a total-field magnetometer is a nuclear precession He3 sensor. Total-field magnetometers are not subject to motion-induced noise to the same extent as vector magnetometers. In order for method 10 to work properly, the geomagnetic noise source must be coherent on both the first and second network nodes 26 and 28. Incoherent noise, such as motion or local time varying signatures tends to null the spatial coherence of the Earth's magnetic field.

As time synchronization works in the 1-30 mHz band, the sampling rate Y may be any sample rate greater than or equal to 60 mHz. For example, a sensor with a sampling rate Y of 5.86 Hz may be used. Any value for the decimation factor Z is possible so long as enough data is available for accurate 1-30 mHz representation. Thus a decimation factor Z that yields a minimum sample rate of 60 mHz is sufficient. For example, if an He3 magnetometer sample rate is 5.86 Hz, the maximum decimation rate would be 97:1. The trade-off here is that very high precision, large tap filters must be used, which may be impractical for implementation. Thus, some additional bandwidth is left as 'excess'—such as a 100 mHz sampling (after decimation) that may be used in one embodiment. A suitable example of the sampling period X is 1000 seconds, but it is to be understood that the sampling period X is not limited to 1000 seconds. Because the coherent region of the Earth's magnetic field is in the 1-30 mHz band as many points as attainable within this region will improve the time synchronization.

The environment in which method 10 may be practiced includes any environment that is substantially free of local magnetic noise. The first and second magnetometers 26 and 28 should not be placed in any environment where the effect of the Earth's magnetic field is substantially reduced. For example, the first and second magnetometers 26 and 28 should not be placed within shielding canisters, such as a multi-layer mu-metal container. However, the 1-30 mHz Earth's magnetic field will propagate through rock, sand, water, etc. Thus, suitable operating environments for method 10 include caves, deep water, and heavily shrouded forests.

Figure 3:
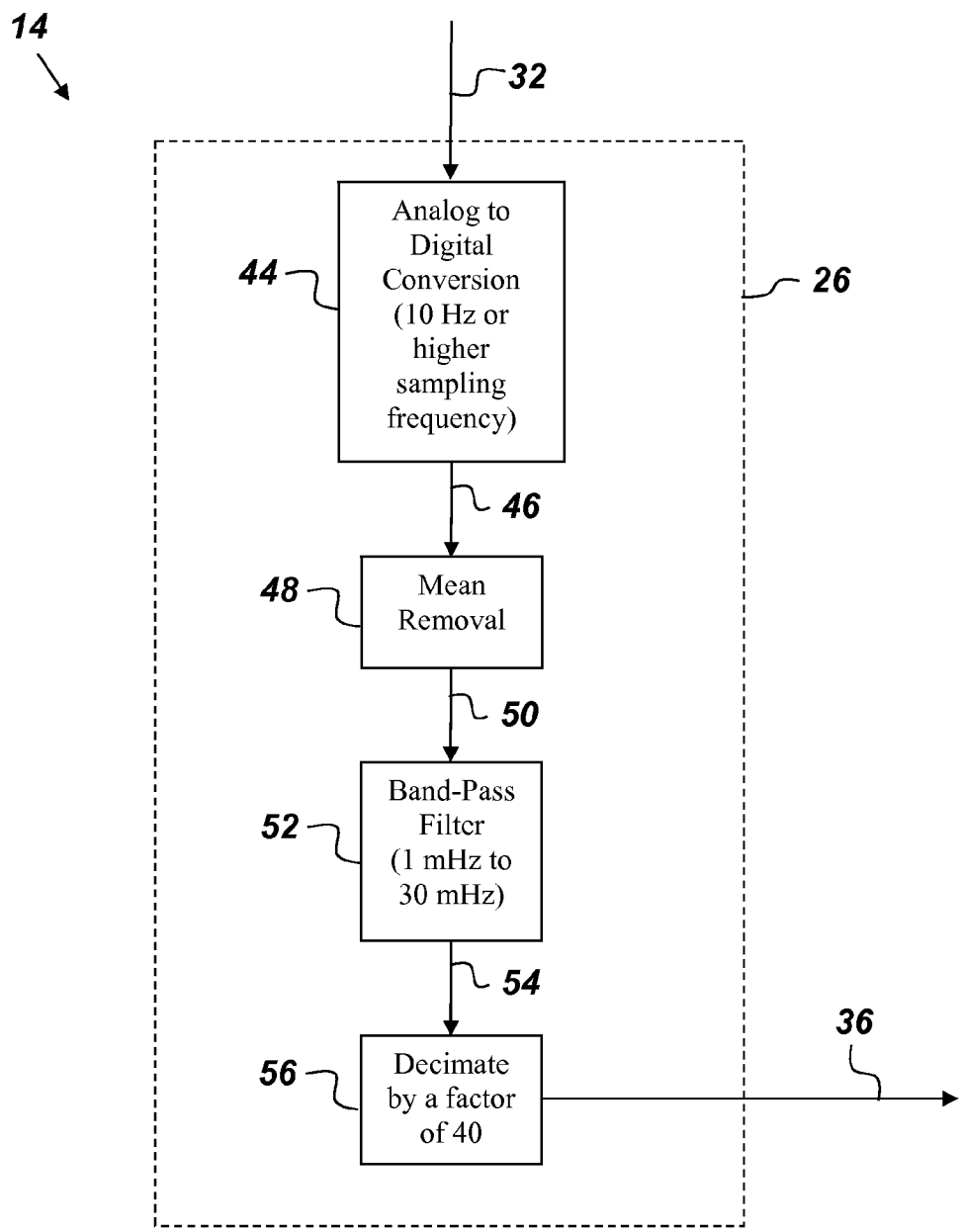
FIG. 3 is a flowchart of another embodiment of the network clock synchronization method.

FIG. 3 is a flowchart outlining sub-steps of step 14 of an embodiment of method 10. In this embodiment the first and second magnetometers 30 and 38 are low-power total-field magnetometers. In sub-step 44 the first network node 26 converts the first output signal 32 from an analog signal into a first digital signal 46 at a sampling rate of 10 Hz or higher. The first and second magnetometers 30 and 38 should have an ability to resolve magnetic field signals of 15 nT or less. In sub-step 48, the first node 26 transforms the first digital signal 46 into a first offset-corrected signal 50 by removing the DC-offset (mean). In step 52, the first node 26 passes the first offset-corrected signal 50 through a band pass filter to create a first filtered signal 54. In this embodiment the band pass filter utilizes a filter pass band from 1 mHz to 30 mHz. This band-pass filter may be used to remove spatially uncorrelated phenomena such as hydrodynamic effects. In sub-step 56, the first filtered signal 54 may be transformed into the first sensor data 36 by decimating the first filtered signal 54 by a factor of 40. This drastically reduces the bandwidth requirements for transmitting the first sensor data 36 between the first and second network nodes 26 and 28 by a factor equal to the decimation rate.

Transmission of the first sensor data 36 can occur one or more times per day, as needed, where the needs depends on the severity of the clock drift present in the networked system. The first sensor data 36 may be transmitted either wired or wirelessly to the second node 28. The wireless transmission could be performed either electromagnetically or acoustically. In this embodiment, the time period X is ten minutes. In other words, ten minutes of data is processed and transmitted between network nodes 26 and 28 to perform clock drift correction calculations. To illustrate how much data must be transmitted between network nodes, consider the following example:

Sampling Frequency Y=10 Hz;
Data Size in Seconds (X)=600 seconds (10 minutes of data)
Data Size in Samples=6000 samples (600 seconds*10 samples/second)
Decimation Rate Z=40

Decimated Data Size in Samples=150 samples (6000 samples/40)

Size of a Floating Point Value=4 bytes

Size of Decimated Data in Bytes=600 bytes (150 samples*4 bytes/sample)

So, using the prescribed sample rate Y of 10 Hz, a time duration X of 10 minutes, and a decimation rate Z of 40, only 600 bytes of data are required to be transferred between the first and second network nodes 26 and 28. After the 600 bytes of the first sensor data 36 have been transmitted, the second network node 28 may then upsample the first sensor data 36 and compute the clock skew between the second node 28 and the first node 26. The second node 28 will then either align its clock 41 with the first node system clock 33 or align its recorded data with that of the first node 26.

Figure 4:
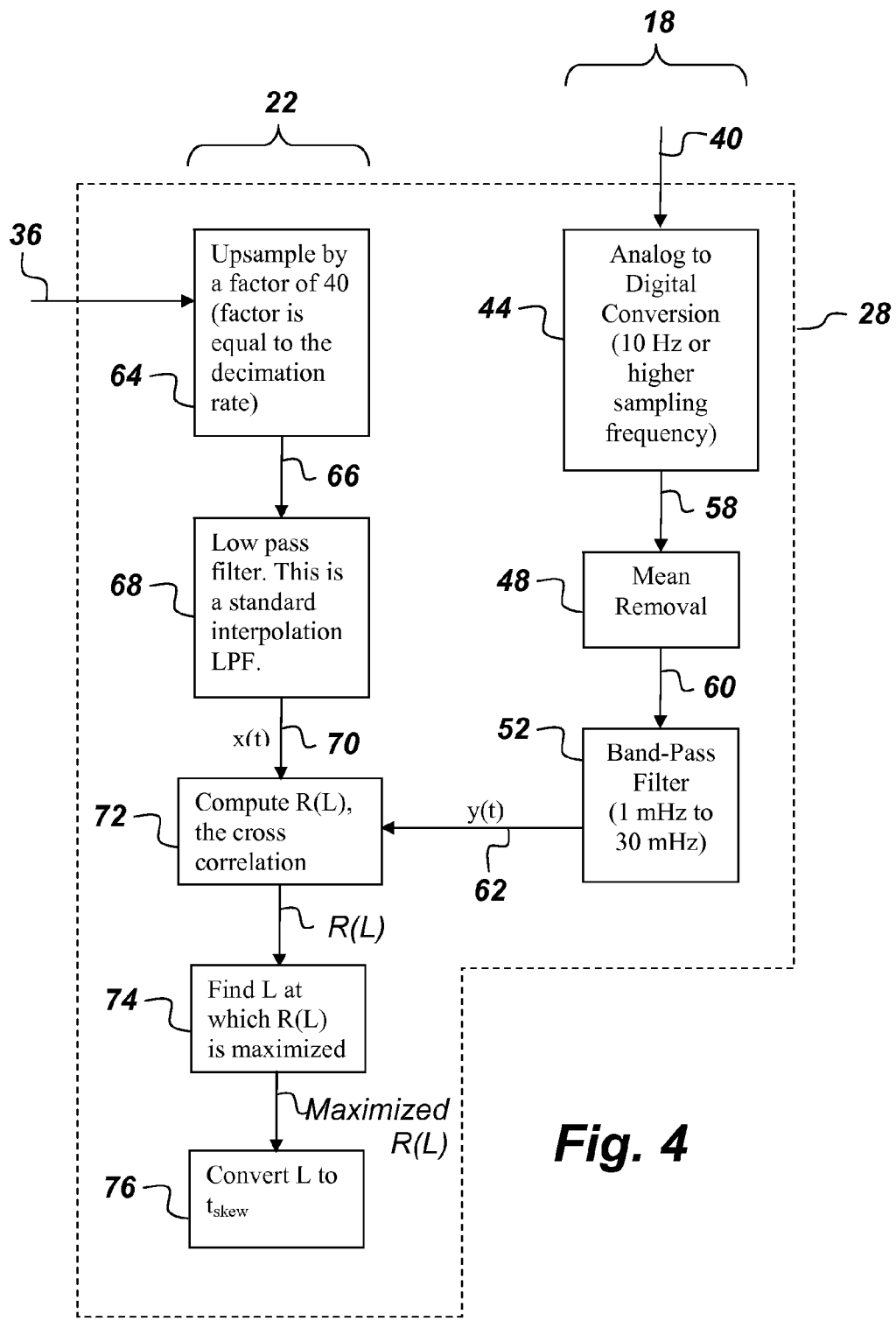
FIG. 4 is a flowchart of another embodiment of the network clock synchronization method.

FIG. 4 is a block diagram outlining sub-steps of steps 18 and 22 that may be employed in the embodiment of method 10 described in FIG. 3. FIG. 4 illustrates the processing that may be performed at the second node 28. Note the similar processing of the second output signal 40 by the second node 28 to the processing of the first output signal 32 by the first node 26. The same sub-steps 44, 48, and 52 may be used by the second node 28 to process the second output signal 40. However, the second output signal 40 is not decimated. It is not necessary to decimate the geomagnetic data which is measured directly at the second node 28, since no transmission of this data occurs. In FIG. 4, the second node 28 utilizes sub-step 44 to convert the second output signal 40 from an analog signal into a second digital signal 58 at a sampling rate of 10 Hz or higher. Next, the second node 28 utilizes sub-step 48 to transform the second digital signal 58 into a second offset-corrected signal 60 by removing the DC-offset (mean). Then, the second node 28 utilizes sub-step 52 to pass the second offset-corrected signal 60 through a band pass filter (1 mHz to 30 mHz) to create a second filtered signal 62, or y(t).

Once received by the second node 28, the first sensor data 36 may be further processed by the second node 28. In sub-step 64, the second node 28 upsamples the received first sensor data 36 by a factor that is equal to the decimation rate (i.e., 40 in this embodiment) to create an upsampled data set 66. The first sensor data 36 is upsampled by a rate equal to the decimation factor. This is desirable in order to maintain the appropriate time resolution when computing the clock skew. In sub-step 68, the second node 28 creates a third filtered signal 70, or x(t), by passing the upsampled data set 66 through a low pass filter to remove unwanted replicas of the true signal in the frequency domain. In sub-step 72, the cross-correlation between x(t) and y(t) is computed. The clock skew between network node pairs is computed via the cross-correlation. The cross-correlation is represented via the following:

$$R(L) = \sum_{t=-\infty}^{\infty} x(t)y(t-L)$$ (Equation 1)

$$\text{for } L = 0, \pm 1, \pm 2, \pm 3, \ldots, \pm N$$

where x(t) and y(t) are the processed geomagnetic-field data sequences for a pair of network nodes, L is the lag parameter, and t is the sample index. Sub-step 74 provides for determining the value of L for which the R(L) is maximized yields the clock skew in number of samples between network node pairs.

A record of previous clock skew calculations is retained at each node. If any large spatially uncorrelated signals are present in the ULF geomagnetic-field data, incorrect clock skew calculations can occur, although this effect is drastically reduced in probability when 10 minutes of data is used. In this case, improbable clock skew values will be calculated, which are easily detectable. Then, previous clock skew calculations will be utilized for clock synchronization. Referring to sub-step 76, once the clock skew in number of samples has been determined, the clock skew in terms of seconds can be computed via the following relation:

$$t_{skew} = \frac{L}{f_s}$$

where $t_{skew}$ is the clock skew in seconds, and $f_s$ is the sampling rate in Hz. The maximum time resolution of the process is $1/f_s$. So, given a 10 Hz sampling, the maximum time resolution of the synchronization will by 0.1 second.

Method 10 is unaffected by transmission latency uncertainty. This is due to its relying on an external source that exists at all terrestrial locations. The time-stamping of messages is not necessary with method 10. Method 10 is particularly useful in underwater environments such as oceanic environments. Any number of network system clocks may be synchronized utilizing method 10.

It is implausible to completely isolate local sources of magnetic field perturbations from the Earth's ambient magnetic field. Thus, when anomalies are present within the data measured by the first magnetometer over a given time period, this time period is discarded. Another time sequence that does not include the anomaly must be used, either by advancing or retarding the data collection window start and end times.

Local magnetic anomalies are detected using the same pre-processing chain (DC mean removal, band-pass filter) including the addition of two additional filters. A whitening adaptive filter is applied in the 1-30 mHz band in order to spectrally flatten (i.e., whiten) the noise present in this frequency band. Then a matched filter based on the Anderson functions is used on the data. The output variance is then computed and compared to a statically defined threshold. If the variance is greater than the threshold, then it is determined a local anomaly is within the data window, the start time to the next window is updated and the entire process is re-run until a variance level below the threshold is found. This window is stored in memory and is used as the reference for time synchronization.

From the above description of method 10, it is manifest that various techniques may be used for implementing the concepts of the method 10 without departing from its scope. The described embodiments are to be considered in all respects as illustrative and not restrictive. It should also be understood that method 10 is not limited to the particular embodiments described herein, but is capable of many embodiments without departing from the scope of the claims.

What is claimed is:

1. A method for synchronizing network clocks comprising the following steps:

measuring with a first total field magnetometer the Earth's magnetic field at a first network node over a time period X as gauged by a first node system clock, wherein the first magnetometer has a resolution of 15 nano-Teslas or less;

processing data measured by the first magnetometer to generate first sensor spatially-coherent data;

measuring with a second total field magnetometer the Earth's magnetic field at a second network node over the time period X as gauged by a second node system clock, wherein the second magnetometer has a resolution of 15 nano-Teslas or less, and wherein the second magnetometer is physically separated from the first magnetometer by a distance of up to one kilometer;

processing data measured by the second magnetometer to generate second sensor spatially-coherent data;

transmitting the first sensor spatially-coherent data from the first network node to the second network node;

calculating a clock drift between the first and second network nodes based on the first sensor spatially-coherent data and the second sensor spatially-coherent data; and adjusting the second node system clock to match the first node system clock based on the calculated clock drift.

2. The method of claim 1, further comprising the step of detecting local magnetic anomalies in the first sensor spatially-coherent data.

3. The method of claim 2, further comprising the step of removing a sequence of data measured by the first magnetometer if the data sequence contains an anomaly due to magnetic field perturbations by advancing or retarding data collection window start and end times.

4. The method of claim 3, wherein sampling rates of the first and second magnetometers are at least 10 Hertz.

5. The method of claim 4, wherein the first and second network nodes are located underwater.

6. The method of claim 1, further comprising the following steps:

measuring with a third total field magnetometer the Earth's magnetic field at a third network node over the time period X as gauged by a third node system clock, wherein the third magnetometer has a resolution of 15 nano-Teslas or less, and wherein the third magnetometer is physically separated from the first and second magnetometers by a distance of no more than one kilometer;

processing data measured by the third magnetometer to generate third sensor spatially-coherent data;

transmitting the first sensor spatially-coherent data from the first network node to the third network node;

calculating a clock drift between the first and third network nodes based on the first sensor spatially-coherent data and the third sensor spatially-coherent data; and adjusting the third node system clock to match the first node system clock based on the calculated clock drift.

7. The method of claim 6, wherein the first sensor spatially-coherent data is decimated prior to being transmitted to the second and third network nodes.

8. The method of claim 4, wherein the time period X is at least 10 minutes.

9. A method for synchronizing the system clocks of underwater network nodes comprising the following steps:

obtaining first geomagnetic field data with a first magnetic sensor coupled to a first network node;

removing a DC-offset of the first geomagnetic field data;

removing spatially uncorrelated phenomena from the DC-offset-removed first geomagnetic field data by filtering the DC-offset-removed first geomagnetic field data with a band-pass filter from 1 mHz to 30 mHz to create a first filtered signal;

decimating the first filtered signal at a decimation rate to create a first processed signal;

transmitting the first processed signal to a second network node separated from the first network node by no more than 1 kilometer;

obtaining second geomagnetic field data with a second magnetic sensor coupled to the second network node;

removing a DC-offset of the second geomagnetic field data;

removing spatially uncorrelated phenomena from the DC-offset-removed second geomagnetic field data by filtering the DC-offset-removed second geomagnetic field data with a band-pass filter from 1 mHz to 30 mHz to create a second filtered signal;

upsampling the first processed signal at the second network node by a factor equal to the decimation rate;

filtering the upsampled signal with a low pass filter to create a third filtered signal;

computing a cross-correlation between the third filtered signal and the second filtered signal;

determining a clock skew based on the cross correlation;

adjusting the second node system clock to match the first node system clock based on the clock skew.

10. The method of claim 9, wherein the first processed signal is transmitted to the second network node via a wireless electromagnetic transmission.

11. The method of claim 9, wherein the first processed signal is acoustically transmitted to the second network node.

12. The method of claim 9, wherein the clock skew is determined by identifying a lag time for which the cross correlation is maximized and then dividing the lag time by a sampling rate of the second magnetic sensor.

13. The method of claim 12, wherein the first and second magnetic sensors are total-field magnetometers having a resolution of 15 nano-Teslas or less.

14. The method of claim 13, wherein the decimation rate is 40.

15. The method of claim 14, further comprising the step of detecting local magnetic anomalies in data measured by the first magnetic sensor due to geomagnetic field perturbations.

16. The method of claim 15, further comprising the step of removing a sequence of data measured by the first magnetometer if the data sequence contains an anomaly due to magnetic field perturbations by advancing or retarding data collection window start and end times.

17. The method of claim 15, wherein the step of detecting local magnetic anomalies further comprises the following sub-steps:

spectrally flattening the noise present in a 1-30 mHz frequency band with a whitening adaptive filter;

using a matched filter based on Anderson functions on the data measured by the first magnetic sensor;

computing an output variance;

comparing the output variance to a statically defined threshold;

updating the start time of the data collection window if the output variance is greater than the threshold.

* * * * *